No. 809,532.         PATENTED JAN. 9, 1906.
H. SCHNACKENBERG.
DEVICE FOR CUTTING BUTTER.
APPLICATION FILED OCT. 25, 1904. RENEWED JULY 15, 1905.

Inventor
H. Schnackenberg

UNITED STATES PATENT OFFICE.

HERMAN SCHNACKENBERG, OF HOBOKEN, NEW JERSEY.

DEVICE FOR CUTTING BUTTER.

No. 809,532.        Specification of Letters Patent.        Patented Jan. 9, 1906.

Application filed October 25, 1904. Renewed July 15, 1905. Serial No. 269,907.

*To all whom it may concern:*

Be it known that I, HERMAN SCHNACKENBERG, a citizen of the United States, residing at Hoboken, in the county of Hudson and State of New Jersey, have invented a new and useful device for Cutting Butter, of which the following is a specification.

This invention is an improved construction of device for cutting butter, the object being to provide an exceedingly cheap and simple means for cutting tub butter horizontally by means of a cutting-wire; and with this object in view the invention consists in the details of construction hereinafter fully described, and pointed out in the claims.

Figure 1:
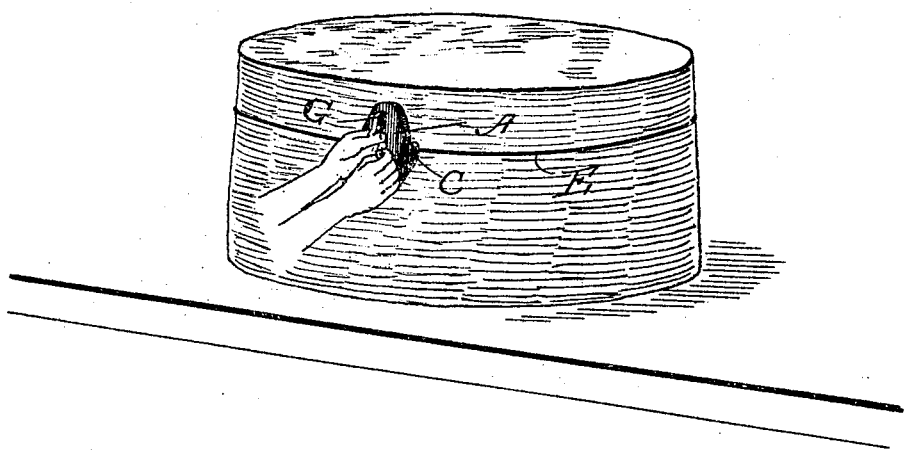
Figure 2:
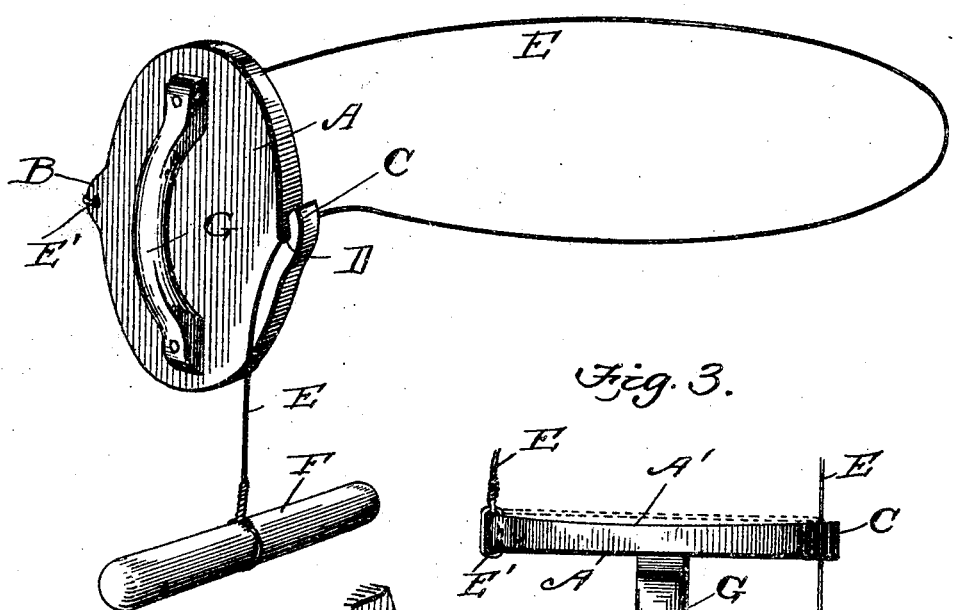
Figure 3:
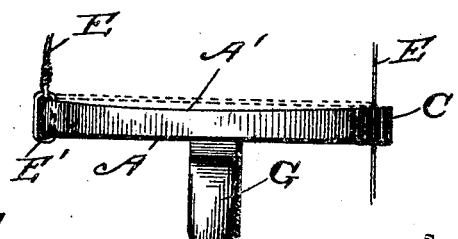
Figure 4:

In the drawings forming a part of this specification, Figure 1 is a view showing the practical application of my invention. Fig. 2 is a detail perspective view of a device. Fig. 3 is a top view of the block and handle and portions of the cutting-wire, and Fig. 4 shows a detail of construction.

In carrying out my invention I employ a thin block A, preferably elliptical in shape and provided with a projection B upon one side and a projection C upon the opposite side, said projection C being slotted, as shown at D, thereby providing a guiding-finger through which the wire E can be drawn by means of the handle F, said wire E being secured to the projection B, as shown at E'.

The inner face of the block A is slightly concaved, as shown at A', in order to snugly fit upon the mass of butter to be cut, and upon the outer side of the block is arranged the handle G, which is grasped by the left hand for the purpose of holding the block in place while the wire is drawn through the slot D by means of a handle F, which is grasped in the right hand, it being understood that the butter to be cut is encircled by the wire E, and the wire is then inserted in the slot D, and it is immaterial whether the pull is to the right or the left or down the operation will be exactly the same, and by means of the device herein shown and described a mass of butter can be quickly and easily cut horizontally by means of the cutting-wire, the guiding-finger serving to hold the wire in its proper position during operation.

While I prefer to use a wooden block A and fine wire E, it is obvious that any construction of cutting wire or cord can be employed and that the block may be made of metal or glass, if preferred.

Having thus fully described my invention, what I claim as new, and desire to secure by Letters Patent, is—

1. A device for cutting butter comprising a block having a cutting-wire connected to one side thereof, and a guiding-finger arranged upon the other side opposite the point of attachment, of the wire.

2. A device for cutting butter comprising a block having a projection at one side and a guiding-finger upon the opposite side, a cutting-wire attached to the projection and adapted to engage the guiding-finger, as set forth.

3. A device for cutting butter comprising a block having a concaved inner face and provided with a handle upon the outer face, said block having a projection upon one side and a guiding-finger upon the opposite side, and a cutting-wire connected to the projection and adapted to engage the guiding-finger, said cutting-wire having a handle connected to its free end, as set forth.

HERMAN SCHNACKENBERG.

Witnesses:
    FRED KAUFMANN,
    EMIL RATELLIER.